(12) United States Patent
DeBruin (10) Patent No.: US 6,815,525 B2
(45) Date of Patent: Nov. 9, 2004

(54) COMPONENT INTRODUCTION INTO MANUFACTURING PROCESS THROUGH RECIRCULATION

(75) Inventor: Bruce Roger DeBruin, Kingsport, TN (US)

(73) Assignee: Eastamn Chemical Company, Kingsport, TN (US)

(*) Notice: Subject to any disclaimer, the term of this patent is extended or adjusted under 35 U.S.C. 154(b) by 316 days.

(21) Appl. No.: 10/013,330

(22) Filed: Dec. 7, 2001

(65) Prior Publication Data

US 2002/0086969 A1 Jul. 4, 2002

Related U.S. Application Data

(60) Provisional application No. 60/254,040, filed on Dec. 7, 2000.

(51) Int. Cl.[7] .............................................. C08G 63/02
(52) U.S. Cl. ...................... 528/272; 422/131; 525/437
(58) Field of Search .......................... 422/131; 526/64; 528/271, 272; 525/437

(56) References Cited

U.S. PATENT DOCUMENTS

| | | | |
|---|---|---|---|
| 2,361,717 A | 10/1944 | Taylor | |
| 3,052,711 A | 9/1962 | Gogau et al. | |
| 3,185,668 A | 5/1965 | Meyer et al. | |
| 3,192,184 A | 6/1965 | Brill et al. | |

(List continued on next page.)

FOREIGN PATENT DOCUMENTS

| | | |
|---|---|---|
| BR | 7906279 | 7/1981 |
| DE | 2200832 | 1/1972 |
| DE | 125 798 | 5/1977 |
| DE | 126 073 | 6/1977 |

(List continued on next page.)

OTHER PUBLICATIONS

Perry, Robert H. and Green, Don, "*Flow in Pipes and Channels*", Perry's Chemical Engineer's Handbook, (1984), pp. 5–23, 6th Edition, McGraw–Hill, United States.

Perry, Robert H. and Green, Don, "*Fluid and Particle Mechanics*", Perry's Chemical Engineer's Handbook, (1984), 5–40 to 5–41, 6th Edition, McGraw–Hill, United States.

Perry, Robert H. and Green, Don, "*Fluid and Particle Mechanics*", Perry's Chemical Engineer's Handbook, (1984), 14–82 to 14–95, 6th Edition, McGraw–Hill, United States.

*Primary Examiner*—Terressa Boykin
(74) *Attorney, Agent, or Firm*—Steven A. Owen; Bernard J. Graves, Jr.

(57) ABSTRACT

A process for introducing a component into a reaction fluid and/or process fluid comprising the steps of: (a) providing a recirculation loop having an influent and an effluent wherein the influent is in fluid communication with a reaction fluid; (b) recirculating at least a portion of the reaction fluid of step (a) through the recirculation loop wherein the reaction fluid flowing through the recirculation loop is a recirculation fluid; (c) decreasing the pressure of the recirculation fluid of step (b) with at least one pressure decreasing device at at least one point in the recirculation loop; and (d) feeding a component into the recirculation loop adjacent to or at the pressure decreasing device of step (c), to thereby introduce a component into the reaction fluid.

28 Claims, 4 Drawing Sheets

U.S. PATENT DOCUMENTS

| | | |
|---|---|---|
| 3,241,926 A | 3/1966 | Parker et al. |
| 3,427,287 A | 2/1969 | Pengilly |
| 3,442,868 A | 5/1969 | Ogata et al. |
| 3,480,587 A | 11/1969 | Porter |
| 3,497,473 A | 2/1970 | Kemkes |
| 3,522,214 A | 7/1970 | Crawford et al. |
| 3,590,070 A | 6/1971 | Martin et al. |
| 3,590,072 A | 6/1971 | Leybourne |
| 3,644,096 A | 2/1972 | Lewis et al. |
| 3,644,294 A | 2/1972 | Siclari et al. |
| 3,644,483 A | 2/1972 | Griehl et al. |
| 3,651,125 A | 3/1972 | Lewis et al. |
| 3,697,579 A | 10/1972 | Balint et al. |
| 3,723,391 A | 3/1973 | Beer et al. |
| 3,781,213 A | 12/1973 | Siclari et al. |
| 3,849,379 A | 11/1974 | Jeurissen et al. |
| 3,867,349 A | 2/1975 | Heeg et al. |
| 3,892,796 A | 7/1975 | Heeg et al. |
| 3,960,820 A | 6/1976 | Pinney |
| 3,988,301 A | 10/1976 | Jeurissen et al. |
| 4,001,187 A | 1/1977 | Itabashi et al. |
| 4,008,048 A | 2/1977 | Hellemans et al. |
| 4,020,049 A | 4/1977 | Rinehart |
| 4,028,307 A | 6/1977 | Ure |
| 4,046,718 A | 9/1977 | Mass et al. |
| 4,049,638 A | 9/1977 | Doerfel et al. |
| 4,064,112 A | 12/1977 | Rothe et al. |
| 4,077,945 A | 3/1978 | Heinze et al. |
| 4,079,046 A | 3/1978 | Brignac et al. |
| 4,089,888 A | 5/1978 | Tokumitsu et al. |
| 4,097,468 A | 6/1978 | James et al. |
| 4,100,142 A | 7/1978 | Schaefer et al. |
| 4,146,729 A | 3/1979 | Goodley et al. |
| 4,204,070 A | 5/1980 | Suzuki et al. |
| 4,212,963 A | 7/1980 | Lehr et al. |
| 4,223,124 A | 9/1980 | Broughton et al. |
| 4,238,593 A | 12/1980 | Duh |
| 4,365,078 A | 12/1982 | Shelley |
| 4,382,139 A | 5/1983 | Kapteina et al. |
| 4,410,750 A | 10/1983 | Langer, Jr. |
| 4,440,924 A | 4/1984 | Kuze et al. |
| 4,452,956 A | 6/1984 | Moked et al. |
| 4,472,558 A | 9/1984 | Casper et al. |
| 4,499,226 A | 2/1985 | Massey et al. |
| 4,542,196 A | 9/1985 | Morris et al. |
| 4,548,788 A | 10/1985 | Morris et al. |
| 4,550,149 A | 10/1985 | Morris et al. |
| 4,551,309 A | 11/1985 | Morris et al. |
| 4,551,510 A | 11/1985 | Morris et al. |
| 4,555,384 A | 11/1985 | Morris et al. |
| 4,680,376 A | 7/1987 | Heinze et al. |
| 4,973,655 A | 11/1990 | Pipper et al. |
| 5,185,426 A | 2/1993 | Verheijen et al. |
| 5,243,022 A | 9/1993 | Kim et al. |
| 5,254,288 A | 10/1993 | Verheijen et al. |
| 5,300,626 A | 4/1994 | Jehl et al. |
| 5,340,906 A | 8/1994 | Shirokura et al. |
| 5,340,907 A | 8/1994 | Yau et al. |
| 5,385,773 A | 1/1995 | Yau et al. |
| 5,413,861 A | 5/1995 | Gallo |
| 5,478,909 A | 12/1995 | Jehl et al. |
| 5,480,616 A | 1/1996 | Richardson et al. |
| 5,496,469 A * | 3/1996 | Scraggs et al. ............ 210/177 |
| 5,573,820 A | 11/1996 | Harazoe et al. |
| 5,594,077 A | 1/1997 | Groth et al. |
| 5,681,918 A | 10/1997 | Adams et al. |
| 5,688,898 A | 11/1997 | Bhatia |
| 5,786,443 A | 7/1998 | Lowe |
| 5,811,496 A | 9/1998 | Iwasyk et al. |
| 5,830,981 A | 11/1998 | Koreishi et al. |
| 5,849,849 A | 12/1998 | Bhatia |
| 5,898,058 A | 4/1999 | Nichols et al. |
| 5,905,096 A | 5/1999 | Lay et al. |
| 5,922,828 A | 7/1999 | Schiraldi |
| 6,069,228 A | 5/2000 | Alsop et al. |
| 6,096,838 A | 8/2000 | Nakamoto et al. |
| 6,100,369 A | 8/2000 | Miyajima et al. |
| 6,103,859 A | 8/2000 | Jernigan et al. |
| 6,111,035 A | 8/2000 | Sakamoto et al. |
| 6,111,064 A | 8/2000 | Maurer et al. |
| 6,113,997 A | 9/2000 | Massey et al. |
| 6,127,493 A | 10/2000 | Maurer et al. |
| 6,355,738 B2 | 3/2002 | Nakamachi |
| 6,623,643 B2 * | 9/2003 | Chisholm et al. ........... 210/620 |
| 2002/0086969 A1 | 7/2002 | Debruin |
| 2002/0128399 A1 | 9/2002 | Nakamoto et al. |
| 2002/0137877 A1 | 9/2002 | Debruin |
| 2002/0180099 A1 | 12/2002 | Keillor, III |
| 2003/0037910 A1 | 2/2003 | Smymov |
| 2003/0133856 A1 | 7/2003 | Le |

FOREIGN PATENT DOCUMENTS

| | | |
|---|---|---|
| DE | 146 298 B | 2/1981 |
| DE | 206 558 | 2/1984 |
| DE | 229 415 A1 | 11/1985 |
| DE | 4235785 A1 | 5/1994 |
| DE | 195 37 930 A1 | 4/1997 |
| EP | 0 850 962 A2 | 7/1998 |
| EP | 0 999 228 A2 | 5/2000 |
| EP | 1 065 193 A1 | 1/2001 |
| FR | 2168990 | 9/1973 |
| FR | 2302778 A1 | 3/1975 |
| GB | 101334 | 12/1965 |
| GB | 1154538 | 6/1969 |
| GB | 2010294 | 6/1979 |
| GB | 2 052 535 A | 1/1981 |
| JP | 424993 B | 3/1967 |
| JP | 4218353 B | 9/1967 |
| JP | 4739043 A | 4/1971 |
| JP | 48 94795 A | 12/1973 |
| JP | 49 28698 A | 3/1974 |
| JP | 49 34593 A | 3/1974 |
| JP | 49 105893 A | 10/1974 |
| JP | 50 82197 A | 7/1975 |
| JP | 51 29460 A | 3/1976 |
| JP | 51 100036 A | 9/1976 |
| JP | 51 136788 A | 11/1976 |
| JP | 51 136789 A | 11/1976 |
| JP | 52 51495 A | 4/1977 |
| JP | 52 71432 A | 6/1977 |
| JP | 52 78845 A | 7/1977 |
| JP | 52 83424 A | 7/1977 |
| JP | 52 87133 A | 7/1977 |
| JP | 53 31793 A | 3/1978 |
| JP | 53 34894 A | 3/1978 |
| JP | 54 41833 A | 4/1979 |
| JP | 54 76535 A | 6/1979 |
| JP | 54 79242 A | 6/1979 |
| JP | 54 100494 A | 8/1979 |
| JP | 54 157536 A | 12/1979 |
| JP | 55 43128 A | 3/1980 |
| JP | 55 108422 A | 8/1980 |
| JP | 55-135133 A | 10/1980 |
| JP | 58 129020 A | 8/1983 |
| JP | 59 47226 A | 3/1984 |
| JP | 59 53530 A | 3/1984 |
| JP | 59 68326 A | 4/1984 |
| JP | 59 71326 A | 4/1984 |
| JP | 60 15421 A | 1/1985 |
| JP | 60 72845 A | 4/1985 |
| JP | 60 115551 A | 6/1985 |

| | | | |
|---|---|---|---|
| JP | 60 120839 A | 6/1985 |
| JP | 60 163918 A | 8/1985 |
| JP | 60 226846 A | 11/1985 |
| JP | 62 207325 A | 9/1987 |
| JP | 62-292831 A | 12/1987 |
| JP | 64 56726 A | 3/1989 |
| JP | 1 102044 A | 4/1989 |
| JP | 3 192118 A | 8/1991 |
| JP | 3 292323 A | 12/1991 |
| JP | 5-78402 | 3/1993 |
| JP | 5 155994 A | 6/1993 |
| JP | 6 247899 A | 9/1994 |
| JP | 7 118208 A | 5/1995 |
| JP | 7 173268 A | 7/1995 |
| JP | 7 238151 A | 9/1995 |
| JP | 8 198960 A | 8/1996 |
| JP | 8 283398 A | 10/1996 |
| JP | 10 36495 A | 2/1998 |
| JP | 1998/259244 A | 9/1998 |
| JP | 11 106489 A | 4/1999 |
| JP | 1999/092555 A | 4/1999 |
| JP | 11 217429 A | 8/1999 |
| JP | 2000/095851 A | 4/2000 |
| KR | 1993-0005144 B1 | 6/1993 |
| KR | 1994-0011540 B1 | 3/1994 |
| NL | 1001787 | 8/1965 |
| NL | 6704303 | 9/1967 |
| PL | 136188 | 8/1987 |
| SU | 973552 | 11/1982 |
| WO | WO 02/26841 A1 | 4/2002 |
| WO | WO 03/006526 A1 | 1/2003 |

OTHER PUBLICATIONS

Nauman, E. B., *"Enhancement of Heat Transfer and Thermal Homogenity with Motionless Mixers"*, American Institute of Chemical Engineer's Journal, (1979), pp. 246–258, vol. 25, No. 2.

Brodkey, Robert S., *"Multiphase Phenomena I: Pipe Flow"*, The Phenomena of Fluid Motions, (1967), pp. 456–538, Addison–Wesley Publishing Company, United States.

Gupta, S.K. and Kumar, ANIL, *"Polyester Reactors"*, Plenum Chemical Engineering Series, (1987), pp. 241–318, Chapter 8, Plenum Press, New York.

U.S. patent application Ser. No. 10/456,212, DeBruin, Filed Jun. 6, 2003.

U.S. patent application Ser. No. 10/456,309, DeBruin, filed Jun. 6, 2003.

U.S. patent application Ser. No. 10/456,448, DeBruin, filed Jun. 6, 2003.

Stahl, Wegmann, Von Rohr;Tubular reactor for liquid reactions with gas release; Catalysis Today 79–80; 2003; pp. 89–95.

* cited by examiner

COMPONENT INTRODUCTION INTO MANUFACTURING PROCESS THROUGH RECIRCULATION

CROSS REFERENCE TO RELATED APPLICATIONS

This application claims priority to U.S. Provisional Application Ser. No. 60/254,040, filed Dec. 7, 2000, which application is hereby incorporated by this reference in its entirety for all purposes.

FIELD OF THE INVENTION

This invention relates to manufacturing processes and more specifically to a process for introducing one or more components into a manufacturing process using a recirculation loop.

BACKGROUND OF THE INVENTION

The main goal of a polyester manufacturing process is, of course, to completely or as near as completely as possible, react or convert the dicarboxylic acid in the reactor to monomer, oligomer, and ultimately into a polymer. It is also commonly known that a continuous feeding of solid diacid reactant directly into a hot reaction mixture may give rise to the solid reactant becoming tacky on account of dihydroxy vapors condensing on the surface of the relatively cold diacid, thus inhibiting efficient polyester formation. Therefore, in an effort to maintain the goal of highest efficiency, conventional polyester processes often utilize large paste tanks for premixing solid dicarboxylic acid reactants before introducing them into a reactor. For example, U.S. Pat. No. 3,644,483 discloses such use of paste tank addition.

While effective, the necessity for a paste tank does increase the costs as well as the amount of space needed to properly install and operate a polyester manufacturing facility. Furthermore, as the business of manufacturing polyesters becomes more competitive, alternative lower cost manufacturing processes and apparatuses have become highly desirable. A variety of processes and apparatus have been developed, however, these systems still contain relatively complex, costly designs that cannot be built or installed quickly. These designs also typically require more costly expertise to properly maintain and operate.

Therefore, the need still exists for a more compact, efficient and cost effective method for introducing reactants, such as terephthalic acid and other solid dicarboxylic acid reactants, into a polyester reaction mixture.

SUMMARY OF THE INVENTION

The present invention therefore provides a process for introducing one or more components into a reaction fluid and/or process fluid of a manufacturing process. More specifically, the process of the present invention pertains to the use of a recirculation loop in connection with a manufacturing process.

In a first aspect, the present invention provides a process for introducing a component into a process fluid comprising the steps of: (a) providing a recirculation loop having an influent and an effluent wherein the influent is in fluid communication with a process fluid; (b) recirculating at least a portion of the process fluid of step (a) through the recirculation loop wherein the process fluid flowing through the recirculation loop is a recirculation fluid; (c) decreasing the pressure of the recirculation fluid of step (b) with at least one pressure decreasing device at at least one point in the recirculation loop; and (d) feeding a component into the recirculation loop adjacent to or at the pressure decreasing device of step (c), to thereby introduce a component into the process fluid.

In a second aspect, the present invention provides a process for introducing a solid polyester precursor reactant into a reaction mixture comprising the steps of: (a) providing a reactor configured to define an internal volume wherein at least a portion of the internal volume is occupied by a reaction mixture comprising a first polyester reactant and a polyester reaction product; (b) providing a recirculation loop having an influent and an effluent wherein the influent is in fluid communication with the internal volume of the reactor; (c) recirculating at least a portion of the reaction mixture through the recirculation loop wherein the first polyester reactant and polyester reaction product flowing through the recirculation loop are recirculation fluids; and (d) feeding a second polyester reactant into the recirculation loop, wherein the second polyester reactant is the solid polyester precursor reactant, to thereby introduce solid polyester precursor reactant into the reaction mixture.

In still a third aspect, the present invention provides a process for introducing a solid polyester precursor reactant into a reaction mixture comprising the steps of: (a) providing a reactor configured to define an internal volume wherein at least a portion of the internal volume is occupied by a reaction mixture comprising a first polyester reactant and a polyester reaction product; (b) providing a recirculation loop having an influent and an effluent wherein the influent is in fluid communication with the internal volume of the reactor; (c) recirculating at least a portion of the reaction mixture through the recirculation loop wherein the first polyester reactant and polyester reaction product flowing through the recirculation loop are recirculation fluids; (d) decreasing the pressure of the recirculation fluids with at least one pressure decreasing device at at least one point in the recirculation loop; and (e) feeding a second polyester reactant into the recirculation loop adjacent to or at the pressure decreasing device, wherein the second polyester reactant is the solid polyester precursor reactant, to thereby introduce solid polyester precursor reactant into the reaction mixture.

Additional advantages and embodiments of the invention will be obvious from the description, or may be learned by practice of the invention. Further advantages of the invention will also be realized and attained by means of the elements and combinations particularly pointed out in the appended claims. Thus, it is to be understood that both the foregoing general description and the following detailed description are exemplary and explanatory of certain embodiments of the invention and are not restrictive of the invention as claimed.

DETAILED DESCRIPTION OF THE INVENTION

The present invention may be understood more readily by reference to the following detailed description and any examples provided herein. It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a", "an", and "the" comprise plural referents unless the context clearly indicates otherwise. For example, reference to a component in the singular is intended to comprise a plurality of components.

Ranges may be expressed herein as from "about" or "approximately" one particular value and/or to "about" or "approximately" another particular value. When such a range is expressed, another embodiment comprises from the one particular value and/or to the other particular value. Similarly, when values are expressed as approximations, by use of the antecedent "about" or "approximately", it will be understood that the particular value forms another embodiment.

Throughout this application, where publications are referenced, the disclosures of these publications in their entireties are hereby incorporated by reference into this application in their entirety to more fully describe the state of the art to which this invention pertains.

As used in the specification and concluding claims, the term "residue" refers to the moiety that is the resulting product of the chemical species in a particular reaction scheme or subsequent formulation or chemical product, regardless of whether the moiety is actually obtained from the chemical species. Thus, for example, an ethylene glycol residue in a polyester refers to one or more —OCH$_2$CH$_2$O— repeat units in the polyester, regardless of whether ethylene glycol is used to prepare the polyester. Similarly, a sebacic acid residue in a polyester refers to one or more —CO(CH$_2$)$_8$CO— moieties in the polyester, regardless of whether the residue is obtained by reacting sebacic acid or an ester thereof to obtain the polyester.

The process and apparatus of the present invention can be used in connection with any known manufacturing process. To that end, as used herein, a "manufacturing process" is intended to include without limitation, any process, chemical or otherwise, related to the production of foods, food additives, food packaging, pharmaceuticals, agriculture, cosmetics, plastics, polymers, textiles, and the like. It is also within the scope of the present invention for a manufacturing process, as used herein, to further relate to organic and/or inorganic chemical reactions.

For example, the instant invention can be used in connection with any polymerization process known to one of ordinary skill in the art of plastics technology and the manufacture thereof, such as an esterification or polycondensation process. Therefore, in one embodiment, the present invention is particularly useful when used in connection with a known polyester manufacturing process.

To this end, it should also be understood that a suitable manufacturing processes according to the present invention can comprise one or more separate and distinct, and/or integrated process features. For example, a manufacturing process can comprise one or more reactors or, in an alternative embodiment, may even comprise a reactor train or system of two or more reactors configured either in series, parallel or a combination thereof. Likewise, in alternative embodiments, a manufacturing processes according to the present invention can comprise one or more of several additional process features such as a mix tank system, paste tank system, mix and feed tank system, water column, adsorption system, distillation column, and the like and combinations thereof.

As used herein, the phrase "polyester manufacturing process" or "polyester process" is intended to refer to an esterification process, an ester exchange process or a polycondensation process. Alternatively, it is further contemplated that a polyester process according the present invention can also comprise a combination of: (1) an esterification process and/or ester exchange process; and (2) a polycondensation process. Therefore, a polyester process according to the present invention can be any known process for forming a polyester monomer, polyester oligomer and/or polyester polymer.

To this end, it should be understood that as used herein, the term "polyester" is intended to include any known polyester derivatives, including, but not limited to, polyetheresters, polyester amides and polyetherester amides. Therefore, for simplicity, throughout the specification and claims, the terms polyester, polyether ester, polyester amide and polyethereseteramide may be used interchangeably and are typically referred to as polyesters, but it is understood that the particular polyester species is dependant on the starting materials, i.e., polyester precursor reactants and/or components.

As used herein, the term "esterification process" or "esterification reaction" refers to a process in which a reactant with an acid functionality, such as a dicarboxylic acid is condensed with an alcohol to produce a polyester monomer. Likewise, as used herein, the term ester exchange process or ester exchange reaction refers to a process in which a reactant with an alkyl end group, such as a methyl end group is reacted to produce a polyester monomer. Therefore, for purposes of simplicity, throughout the specification and appended claims, the terms esterification and ester exchange are used interchangeably and are typically referred to as an esterification, but it is understood that esterification or ester exchange depends upon the starting materials.

As indicated above, a manufacturing process according to the present invention can comprise two more separate and/or integrated process features. Therefore, it is within the scope of the present invention for an esterification or ester exchange process to comprise one or more integrated process features. For example, in one embodiment, an esterification process can comprise one esterification reactor. However, in an alternative embodiment, it is possible for the esterification process to comprise a system or train of esterification reactors configured in series, parallel, or a combination thereof. Therefore, in another embodiment, the esterification process may comprise two or more esterification reactors, all of which preferably are in fluid communication with each other.

As used herein, the term "polycondensation" is intended to refer to any known process for forming an oligomer and/or polymer. For example, in one embodiment, a polycondensation process according to the present invention is a process for forming a polyester oligomer and/or a polyester polymer.

Furthermore, in similar fashion to an esterification process as previously defined above, the polycondensation process can also comprise one or more separate and/or integrated process features. For example, in one embodiment, the polycondensation process can comprises one polycondensation reactor. However, in an alternative embodiment, the polycondensation process can comprise a system or train of two or more polycondensation reactors configured in series, parallel or a combination thereof. Therefore, in a second embodiment, the polycondensation process of the present invention can comprises two or more polycondensation reactors, all of which are preferable in fluid communication with each other. In still another embodiment, the polycondensation process comprises a first prepolymer or oligomer polycondensation reactor in fluid communication with a finisher or polymer reactor.

To that end, as used herein, the term "prepolymer reactor" or "oligomer reactor" is intended to refer to a first polycondensation reactor. Although not required, the prepolymer reactor is typically kept under vacuum. One of ordinary skill in the art will appreciate that a prepolymer reactor is often, without limitation, used to initially grow a prepolymer chain from a feed length of from approximately 1 to 5, to an outlet length of approximately 4 to 30.

In connection therewith, the term "finisher reactor" or "polymer reactor" as used herein is intended to refer to the last melt phase of polycondensation reaction system. Again, although not required, the second polycondensation or finisher reactor is often kept under vacuum. Furthermore, one of ordinary skill in the art will also appreciate that the finisher reactor is typically used to grow the polymer chain to the desired finished length.

The term "reactor," as used herein, is intended to refer to any known reactor that is suitable for use in a manufacturing process as defined herein. As such, a suitable reactor for use with the process and apparatus of the present invention is a reactor that is configured to define an internal volume wherein during any given manufacturing process, at least a portion of the internal volume of the reactor is occupied by one or more reaction fluids and/or process fluids.

Examples of suitable reactors for use with the process of the present invention include, without limitation, a pipe reactor, such as that disclosed in U.S. Provisional Application Serial No. 60/254,040, filed Dec. 7, 2000, and U.S. Utility Patent Application for a "Low Cost Polyester Process Using a Pipe Reactor," filed on Dec. 7, 2001, which applications are hereby incorporated by this reference in their entireties for all purposes. In an alternative embodiment, the process and apparatus of the present invention can also be used with a continuous stirred tank reactor, a reactive distillation column, stirred pipe reactor, thermal siphon reactor, forced recirculation reactor, trickle bed reactor, and any other reactor or reactor mechanism known for use in a manufacturing process. It should also be understood that it is within the scope of the present invention for any of one or more of the reactors set forth herein to be configured for use in either a continuous, batchwise, or semi-batchwise manufacturing process.

As used herein, the term "reaction fluid" or "process fluid" is intended to refer to one or more fluids that are present within any given manufacturing process. By definition, the reaction fluid and/or process fluid comprises at least one liquid and/or gas. To this end, the at least one liquid and/or gas can be a reactant or, alternatively, can be an inert component. It is also within the scope of the present invention for a reaction fluid and/or process fluid to optionally comprise one or more solid components as well. In accordance with this embodiment, the one or more solid component can be completely dissolved to provide a homogenous mixture or, alternatively, the reaction fluid and/or process fluid can be a slurry, dispersion, and/or suspension. In still another embodiment, the reaction fluid and/or process fluid can comprise a reaction mixture as defined below.

As used herein, the term "reaction mixture" refers to a mixture of two or more components present within a given manufacturing process. In one embodiment, the reaction mixture comprises one or more reactants, such as a polyester precursor reactant. In an alternative embodiment, the reaction mixture comprises one or more reaction products, such as a polyester reaction product. In still another embodiment, the reaction mixture comprises one or more reactants and one or more reaction products.

A "polyester process reaction mixture", as used herein, refers to a reaction mixture comprising two or more polyester process components. In one embodiment, the polyester process reaction mixture comprises at least one first polyester precursor reactant and at least one polyester reaction product. A such, in one aspect, the present invention is envisioned for use with any known method and apparatus for converting reactants and/or other components into a polyester reaction product. Therefore, the process of the present invention is applicable to the formation of any polyester reaction product.

As stated above, in one embodiment, the polyester process reaction mixture comprises at least one first polyester precursor reactant. According to the invention, the "first polyester precursor reactant" comprises at least one dihydroxy compound that is suitable for use in a polyester process as defined herein. It is referred to as a precursor in that it is a reactant used to make the polyester. Typically, the first polyester precursor reactant is a fluid or, alternatively, is heated to be a vapor, however, it is also within the scope of the invention for the first reactant to be a solid dihydroxy compound as well. In one embodiment, the first polyester precursor reactant preferably comprises ethylene glycol.

As stated above, a polyester process reaction mixture can also comprise at least one polyester reaction product. Accordingly, the "polyester reaction product" as used herein refers to any polyester monomer, polyester oligomer, or any polyester homopolymer or polyester copolymer comprising at least one dicarboxylic acid residue and at least one dihydroxy residue.

Additionally, in another embodiment, a polyester process reaction product may include polyesters comprising small amounts of trifunctional, tetrafunctional or other polyfunctional comonomers, crosslinking agents, and/or branching agents, such as trimellitic anhydride, trimethylolpropane, pyromellitic dianhydride, pentaerythritol, and other polyester forming polyacids or polyols generally known in the art. Furthermore, although not required, a polyester process reaction product can also comprise additional additives normally used in polyester manufacturing processes. Such additives include without limitation, catalysts, colorants, toners, pigments, carbon black, glass fibers, fillers, impact modifiers, antioxidants, stabilizers, flame retardants, reheat aids, acetaldehyde reducing compounds, oxygen scavenging compounds, polyfunctional branching agents, polyfunctional crosslinking agents, comonomers, hydroxycarboxylic acids, UV absorbing compounds, barrier improving additives, such as platelet particles and the like.

Furthermore, in still another embodiment, the polyester process reaction product may further include, without limitation, a polyester residue comprising comonomer residues in amounts up to about up to about 50 mole percent of one or more different dicarboxylic acids and/or up to about 50 mole percent of one or more dihydroxy compounds on a 100 mole % dicarboxylic acid and a 100 mole % dihydroxy basis. In certain embodiments comonomer modification of the dicarboxylic acid component, the dihydroxy component or each individually of up to about 25 mole % or up to about 15 mole % may be preferred.

Suitable dicarboxylic acids for use with the present invention include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. More specifically, examples of suitable dicarboxylic acids include terephthalic acid, phthalic acid, isophthalic acid, naphthalene-2,6-dicarboxylic acid, cyclohexanedicarboxylic acid, cyclohexanediacetic acid, diphenyl-4,4'-dicarboxylic acid, dipheny-3,4'-dicarboxylic acid, succinic acid, glutaric acid, adipic acid, azelaic acid, sebacic acid, mixtures thereof and the like.

Likewise, suitable dihydroxy compounds according to the present invention include cycloaliphatic diols preferably having 6 to 20 carbon atoms or aliphatic diols preferably having 3 to 20 carbon atoms. Specific examples of such diols include ethylene glycol, diethylene glycol, triethylene glycol, 1,4-cyclohexane-dimethanol, propane-1,3-diol, butane-1,4-diol, pentane-1,5-diol, hexane-1,6-diol, neopentylglycol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2,4,4-tetramethylcyclobutanediol, 2,2-bis-(3-hydroxyethoxyphenyl)-propane, 2,2-bis-(4-hydroxypropoxyphenyl)-propane, isosorbide, hydroquinone, mixtures thereof and the like.

Suitable dicarboxylic acid comonomers include without limitation, aromatic dicarboxylic acids, aliphatic dicarboxylic acids, esters of aliphatic or aromatic dicarboxylic acids, anhydrides of aliphatic or aromatic dicarboxylic esters, and mixtures thereof. In one embodiment, it is preferred that suitable dicarboxylic acid comonomers include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. To this end, more specific examples of suitable dicarboxylic acid comonomers include terephthalic acid, phthalic acid, isophthalic acid, naphthalene-2,6-dicarboxylic acid, cyclohexanedicarboxylic acid, cyclohexanediacetic acid, diphenyl-4,4'-dicarboxylic acid, dipheny-3,4'-dicarboxylic acid, succinic acid, glutaric acid, adipic acid, azelaic acid, sebacic acid, mixtures thereof and the like.

Suitable dihydroxy comonomers include without limitation aliphatic or aromatic dihydroxy compounds and mixtures thereof. In one embodiment, it is preferred that the suitable dihydroxy comonomers include cycloaliphatic diols preferably having 6 to 20 carbon atoms or aliphatic diols preferably having 3 to 20 carbon atoms. More specific examples of such diol comonomers include ethylene glycol, diethylene glycol, triethylene glycol, 1,4-cyclohexane-dimethanol, propane-1,3-diol, butane-1,4-diol, pentane-1,5-diol, hexane-1,6-diol, neopentylglycol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2,4,4 tetramethylcyclobutanediol, 2,2-bis-(3-hydroxyethoxyphenyl)-propane, 2,2-bis(4-hydroxypropoxyphenyl)-propane, isosorbide, hydroquinone, BDS-(2,2-(sulfonylbis)4,1-phenyleneoxy))bis(ethanol), mixtures thereof and the like.

While the process and apparatus of the present invention is applicable to any manufacturing process requiring the introduction of one or more components into a reaction fluid and/or process fluid, it is particularly useful for polyester manufacturing processes. To this end, preferred polyester manufacturing processes include, but are not limited to, processes for manufacturing homo and copolymers of PET, PETG (PET modified with CHDM comonomer), fully aromatic or liquid crystalline polyesters, biodegradable polyesters, such as those comprising butanediol, terephthalic acid and adipic acid, poly(cyclohexane-dimethylene terephthalate) homopolymer and copolymers, homopolymer and copolymers of CHDM, and dimethyl cyclohexanedicarboxylate, aliphatic-aromatic copolyesters, and mixtures thereof.

As used herein, the term "second polyester reactant" is intended to refer to a polyester precursor reactant that is introduced into the polyester process reaction mixture via the recirculation loop. The second polyester reactant is preferably a solid polyester precursor reactant, which is typically a solid dicarboxylic acid. However, in an alternative embodiment, the second polyester reactant can be a fluid. It is referred to as a precursor in that it is a reactant used to make the polyester. To this end, it should be understood that the second polyester precursor reactant can be any one or more of the dicarboxylic acids previously set forth herein. However, in one embodiment, the second polyester reactant is preferably solid terephthalic acid.

As used herein, the term "component" is intended to refer to any reactant, inert fluid or solid additive, comonomer, catalyst, colorant, pigment, toner, fiber, glass, filler, modifier, such as a viscosity, melting point, or vapor pressure modifier, antioxidant, stabilizer, flame retardant, reheat aid, acetaldehyde reducing agent, oxygen scavenger agent, polyfunctional crosslinking agents and/or polyfunctional branching agents, such as those previously described herein, UV absorbing agent, barrier improving additive, pinning agent (to add magnetic properties for film extrusion), and the like. To this end, the term "component" refers to any solid, liquid or gas substance known for use in a given manufacturing process.

One of ordinary skill in the art will appreciate that the reaction conditions (temperatures, pressures, flow rates, etc.) and materials charged to the reactor or other process features (reactants, co-reactants, comonomers, additives, catalysts, components, etc.) are those typically found in the prior art for the commensurate manufacturing process. However, it will also be understood that the optimization of such conditions will be readily available or otherwise obtainable through routine experimentation.

As stated above, the present invention provides a process for introducing one or more components into a reaction fluid and/or process fluid of a manufacturing process. More specifically, the process of the present invention pertains to the use of a recirculation loop in connection with a manufacturing process as previously defined herein.

Accordingly, in a first aspect, the present invention provides a process for introducing a component into a process fluid comprising the steps of: (a) providing a recirculation loop having an influent and an effluent wherein the influent is in fluid communication with a process fluid; (b) recirculating at least a portion of the process fluid of step (a) through the recirculation loop wherein the process fluid flowing through the recirculation loop is a recirculation fluid; (c) decreasing the pressure of the recirculation fluid of step (b) with at least one pressure decreasing device at at least one point in the recirculation loop; and (d) feeding a component into the recirculation loop adjacent to or at the pressure decreasing device of step (c), to thereby introduce a component into the process fluid.

In a second aspect, the present invention provides a process for introducing a solid polyester precursor reactant into a reaction mixture comprising the steps of: (a) providing a reactor configured to define an internal volume wherein at least a portion of the internal volume is occupied by a reaction mixture comprising a first polyester reactant and a polyester reaction product; (b) providing a recirculation loop having an influent and an effluent wherein the influent is in fluid communication with the internal volume of the reactor; (c) recirculating at least a portion of the reaction mixture through the recirculation loop wherein the first polyester reactant and polyester reaction product flowing through the recirculation loop are recirculation fluids; and (d) feeding a second polyester reactant into the recirculation loop, wherein the second polyester reactant is the solid polyester precursor reactant, to thereby introduce solid polyester precursor reactant into the reaction mixture.

In still a third aspect, the present invention provides a process for introducing a solid polyester precursor reactant into a reaction mixture comprising the steps of: (a) providing a reactor configured to define an internal volume wherein at least a portion of the internal volume is occupied by a reaction mixture comprising a first polyester reactant and a polyester reaction product; (b) providing a recirculation loop having an influent and an effluent wherein the influent is in fluid communication with the internal volume of the reactor; (c) recirculating at least a portion of the reaction mixture through the recirculation loop wherein the first polyester reactant and polyester reaction product flowing through the recirculation loop are recirculation fluids; (d) decreasing the pressure of the recirculation fluids with at least one pressure decreasing device at at least one point in the recirculation loop; and (e) feeding a second polyester reactant into the recirculation loop adjacent to or at the pressure decreasing device, wherein the second polyester reactant is the solid polyester precursor reactant, to thereby introduce solid polyester precursor reactant into the reaction mixture.

As used herein, a "recirculation loop" refers to any means for recirculating at least a portion of a reaction fluid and/or process fluid contained within any given manufacturing process, wherein the recirculation loop further comprises an influent and an effluent. Furthermore, it should be understood that the scope of the present invention is not limited to the use of one recirculation loop but alternatively comprises such embodiments as any two or more recirculation loops configured in series, parallel or a combination thereof.

To this end, it should be understood that the influent of a recirculation loop can be in fluid communication with any one or more locations and/or process features of the manufacturing process. Furthermore, as previously set forth herein, suitable manufacturing processes according to the present invention can comprise one or more separate and distinct, and/or integrated process features. For example, a manufacturing process can comprise one or more reactors or, in an alternative embodiment, may even comprise a reactor train or system of two or more reactors configured either in series, parallel or as a combination of both.

Therefore, in one embodiment, the influent of the recirculation loop is in fluid communication with the internal volume of one or more reactors. More specifically, turning to a polyester manufacturing process as an example, in one embodiment, the influent of the recirculation loop can be in fluid communication with one or more of a first esterification reactor; a second esterification reactor; a prepolymer reactor; and a finisher reactor. In still another embodiment, the influent of the recirculation loop can be in fluid communication with any one or more locations intermediate any two reactors or other process features.

For example, in one embodiment a reaction fluid is introduced into the recirculation loop from a polycondensation reactor. In another embodiment, the reaction fluid is introduced into the recirculation loop from an esterification reactor. In still another embodiment, the reaction fluid is introduced into the recirculation loop from both an esterification reactor and a polycondensation reactor. Thus, in this embodiment, the infeed to the recirculation loop is not from, or not solely from, an esterification reactor.

As previously discussed herein, a manufacturing processes according to the present invention can further comprise one or more additional features such as a mix tank system, paste tank system, mix and feed tank system, water column, adsorption system, distillation column, and the like. Therefore, it is also within the scope of the present invention for the influent of the recirculation loop to be in fluid communication with any one or more of the additional process features set forth above. For example, in one embodiment, the influent of the recirculation loop is in fluid communication with a mix tank system. To this end, the influent of the recirculation loop can be in fluid communication with any aspect or feature of a manufacturing process provided the influent is in fluid communication with at least one reaction fluid and/or process fluid.

Similar to the possible configurations and/or spatial arrangements of the influent, the effluent of the recirculation loop can also be in fluid communication with any one or more points along the manufacturing process. Therefore, turning again to a polyester manufacturing process as an example, in one embodiment, the effluent can be in fluid communication with one or more of a first esterification reactor; a second esterification reactor; a prepolymer reactor; and a finisher reactor. In still another embodiment, the effluent of the recirculation loop can be in fluid communication with any one or more points intermediate any two reactors or other process features. Moreover, in still another embodiment, the effluent of the recirculation loop can even be in fluid communication with one or more additional process features set forth herein. Therefore, in one embodiment, the effluent can be in fluid communication with a mix tank system.

In accordance with these and other aspects of the present invention, in one embodiment, the recirculation fluids can exit the recirculation loop and re-enter the manufacturing process at the same point where the recirculation fluids were originally taken from the reaction process. Alternatively, the recirculation fluids can exit the recirculation loop and re-enter the manufacturing process at any point either upstream and/or downstream from the influent to the recirculation loop. To this end, one of ordinary skill in the art will appreciate that certain process conditions, i.e., influent and effluent locations, can be optimized in accordance with the particular manufacturing process through only routine experimentation As used in the description and appended claims, it should also be understood that as used herein, the one or more reaction fluid and/or process fluid flowing through the recirculation loop, are referred to as "recirculation fluids."

The recirculation loop preferably comprises a means for increasing the pressure and/or velocity of the recirculation fluids flowing therethrough. The pressure increasing means is located intermediate to the influent and effluent of the recirculation loop. It should be understood that any known means for increasing the pressure and/or velocity of recirculation fluids can be used with the present invention. However, in a preferred embodiment, the pressure increasing means is a recirculation pump.

According to the invention, the recirculation pump can be any pump known in the art, non-limiting examples of which include a centrifugal pump such as an in-line vertical centrifugal pump; positive displacement pump; power piston; screw pump, such as a double ended, single ended, timed and/or untimed; rotary pump, such as a multiple rotary screw, circumferential piston, lore, rotary valve, and/or flexible member; jet pump, such a single nozzle or multiple nozzle eductor; or an elbow pump. In one embodiment, the preferred pump is an in-line centrifugal pump that is located elevationally below the influent to obtain proper net positive suction head ("NPSH").

Once the recirculation fluids pass through the influent and the recirculation pump to increase the pressure, it is desirable to decrease the pressure of the recirculation fluids—at least temporarily—at a location downstream from the recirculation pump. The advantage of decreasing the pressure is so that other, components, such as a solid polyester precursor reactant, can be easily directed into the recirculation loop.

The pressure of the recirculation fluids can be decreased using any known means for decreasing pressure in a fluid line. In alternative embodiments, the pressure of the recirculation fluids is decreased by using an eductor, a siphon, exhauster, venturi nozzle, jet; and/or injector. In one embodiment, an eductor is used through which at least a portion of the recirculation fluids flow. In accordance with this embodiment, the eductor pulls a slight vacuum, or sub-atmospheric pressure, at its throat.

For best results, one of ordinary skill in the art will also appreciate that an eductor or other pressure decreasing device will have a given "NPSH" and viscosity requirement depending on the dimensions, mechanical properties, and other specifications of the particular pressure decreasing device used. Accordingly, an additional advantage of the present invention is the ability to obtain a synergy between the pressure decreasing device and the "NPSH" and viscosity properties of the desired manufacturing process.

Using an eductor as an example, as manufactured, the eductor will have a given "NPSH" and viscosity requirement for which it provides the best results. As such, one of ordinary skill in the art, either experimentally or empirically, will be able to locate the point or points in any given manufacturing process where the "NPSH" and viscosity of the recirculation fluids satisfy the requirements for the eductor's best performance in connection with feeding additional components, such as a solid reactant, into the recirculation loop. However, it will be understood that certain restraints may limit the availability of placing the eductor on a limited number of viable locations within a manufacturing facility.

Therefore, in one embodiment, the eductor or other pressure decreasing device can be specially manufactured for use in a particular location within the polyester manufacturing process. However, in an alternative and more preferred embodiment, the recirculation fluids themselves can be modified in order to obtain a synergy with a given pressure decreasing device, such as an eductor. As such, one of ordinary skill in the art will appreciate that by modifying the properties of the recirculation fluids, any given eductor can be placed at any given point in a manufacturing process thus adding much needed flexibility and freedom of location to a manufacturing facility.

To this end, the properties of the recirculation fluids can be modified by altering the viscosity and/or vapor pressure of the fluids. Such modifications can be made by increasing or decreasing the temperature of the reaction fluid and/or process fluid and/or by the addition of additives into the recirculation loop.

The viscosity of the recirculation fluids can be modified, typically lowering the viscosity, by raising the temperature and/or by feeding a viscosity decreasing additive into the recirculation loop. To this end, in one embodiment, the viscosity can be lowered by preheating an additive, such as a liquid diol, prior to entry into the recirculation loop. In accordance with this embodiment, it is further contemplated that said preheating can further include a phase change of the additive. Therefore, in one embodiment, the diol or other additive could be heated to a vapor phase before being introduced into the recirculation loop.

By heating the additive prior to entry into the recirculation loop, the temperature of the recirculation fluid increases upon entry and mixing of the preheated additive and thereby reduces the viscosity of the recirculation fluid. It should be understood that the preheated additive can be added at any point along the recirculation loop. Furthermore, it should also be understood that the additives are not limited to liquids and can include solids, liquids or gases or mixtures thereof.

As previously set forth herein, it may also be necessary to alter the vapor pressure of the recirculation fluids. Therefore, in another embodiment, the vapor pressure of the recirculation fluids can be increased by venting the recirculation loop to allow the release of entrained gases. A suitable venting mechanism is the same as that described below and can be placed at any one or more points along the recirculation loop. However, in a preferred embodiment, a venting mechanism is placed upstream from the pressure decreasing device.

In an alternative embodiment, the vapor pressure can also be increased by cooling the recirculation fluids. Said cooling can be by evaporative means or otherwise. Additionally, cooling of the recirculation fluid can be achieved by feeding relatively cooler additives into the recirculation loop. In still another embodiment, the vapor pressure of the recirculation fluids can be altered by feeding an additive into the recirculation loop that is known to either increase or decrease the vapor pressure of a fluid stream.

By practicing the present invention, it will also be understood that it may be desired to heat the recirculation loop apparatus itself. Accordingly, a suitable heating means for the recirculation loop can take numerous forms. First, the recirculation loop may be heated by a variety of media, through various surfaces. Induction heating may also be used. More preferably, the present invention provides heat transfer media ("HTM") that are in thermal communication with a portion of the exterior surface of the recirculation loop along at least a portion of the recirculation loop between its influent and effluent. The heat transfer media can circumscribe the entire outer diameter of the exterior surface and extend substantially the full length of the recirculation loop. Alternatively, heat can also be added by inserting heat exchangers or by adding heated components into the recirculation loop.

In still another embodiment, a heat exchanger can be located intermediate the recirculation loop, wherein the recirculation loop is in different sections and each effluent from one section is fed through a heat exchanger to heat the recirculation fluids. This heat exchanger intermediate the recirculation loop system is especially applicable if an unjacketed pipe for is utilized for the recirculation loop. In still another embodiment, microwave heating may also be used.

To feed or supply the additional components, such as a solid polyester precursor reactant into the recirculation loop, a feeding conduit is used that has a discharge end in fluid communication with the recirculation line adjacent to or at the means for reducing the pressure of the recirculation fluids. The desired reactants to be fed are directed into the pressure decreasing device and thereby into the recirculation line from the decreased pressure of the recirculation fluids developed by the pressure decreasing device. The feeding conduit also includes a receiving end, which is opposed to the discharge end.

If desired, the feeding conduit can further comprise an integrated feeding system used to meter and to selectively feed a component into the recirculation loop. In accordance with this embodiment, the first feature of the feeding system is a solid storage device, such as a silo, dust collector, or bag house in fluid communication with the receiving end of the feeding conduit used for storing the component or components to be fed into the recirculation loop. A solid metering device, such as a rotary air lock, a piston and valve (hopper), double valve, bucket conveyor, blow tank, or the like can also be located in communication with the solid storage device for receiving the component from the solid storage device. A third feature of the feeding system is a loss in weight feeder that is in communication with the solid metering device and also in communication with the discharge end of the feeding conduit. The loss in weight feeder can be weigh cells, a belt feed, hopper weight scale, volumetric screw, mass flow hopper, hopper or feed bin weight loss, or the like.

Thus, in one embodiment, the component is fed into the recirculation loop from the solid storage device, to the solid metering device, into the loss in weight feeder, through the discharge end of the feeding conduit, and then is directed into the recirculation loop adjacent to or into the pressure decreasing device. It should be understood however, that depending on process conditions and other limitations within the manufacturing facility, the features set forth above can be arranged in any desired combination. That is to say that the feeding system set forth above is not limited to one spatial arrangement.

Therefore, in another embodiment, a component can be fed into the recirculation loop from a feeding system wherein the component travels from a weighed solid storage device, to a solid metering device, through the discharge end of the feeding conduit, and then is directed into the recirculation loop adjacent the pressure decreasing device. Moreover, in still another embodiment, a component can be fed into the recirculation loop from a first storage device, to a weighing device, into a second storage device, to a metering device and then through the discharge end of the feeding conduit and into the recirculation loop adjacent to or into a pressure decreasing device. To this end, it will be appreciated that any known feeding system and arrangement thereof can be used with the process and apparatus of the present invention.

It is also within the scope of the present invention for the feeding system described above to feed more than one component into the recirculation loop. To this end, in one embodiment, two or more components can be premixed prior to their addition into the feed system. Alternatively, in another embodiment, a plurality of feeding systems can operate in parallel. Moreover, in still another embodiment, the feeding system described above can be configured to add multiple components into the recirculation loop in series.

As previously suggested herein, it should also be understood that depending on the particular manufacturing process, reaction conditions and other manufacturing process characteristics, it may be necessary for the recirculation loop to include various additional features in order to achieve a maximum operating efficiency and the best results from the recirculation loop. For example, it may be necessary to incorporate one or more venting mechanisms to release vapors contained therein. Additionally, as previously discussed, it may also be necessary to heat the recirculation loop to decrease the viscosity of the recirculation fluids or to aid in the dissolution of a solid component contained within the recirculation fluids.

With regard to the removal of vapors, while flowing from the influent of the recirculation loop to the effluent of the recirculation loop, the recirculation fluids may contain vapor or gases as a result of chemical reactions, heating, addition of solid reactants through the feed system or other reasons. As such, the present invention optionally provides a means for removing said vapors from the recirculation loop intermediate the recirculation loop's influent and effluent.

To this end, entrained gases can be vented from a recirculation fluid by controlled reduction of the flow velocity of the fluid in a degassing enclosure coupled with controlled venting of collected gas from the degassing enclosure. More preferably, it has been found that gases entrained in a fluid stream can be separated from the fluid by incorporating a length of degas piping in the flow path of the fluid stream and releasing the separated gases through a standpipe, or a flow-controlled vent.

It should be understood that, as used herein, the term "entrained" and like terms, refers to undissolved gas present in a fluid; for example, gas in a fluid in the form of bubbles, microbubbles, foam, froth or the like.

In the presently preferred embodiment, the vapor removing means, or degassing means, comprises a venting mechanism incorporated into the recirculation loop. The venting mechanism is positioned so that either all or a portion of the recirculation fluids traversing within the interior surface of the recirculation loop also flow through the venting mechanism when flowing from the influent to the effluent.

The venting mechanism functions to slow the velocity of the recirculation fluids in the recirculation loop to an extent sufficient to permit entrained gas to separate from the recirculation fluids. The venting mechanism preferably produces a laminar, stratified, non-circular, two-phase gas/liquid flow. The extent of velocity reduction in the venting mechanism to provide the desired two-phase (gas/liquid) flow can be determined by one of skill in the art using (1a) the size of the gas bubbles likely present and the viscosity of the recirculation fluid, or (1b) the physical properties of both the liquid and the gas, and (2) the anticipated flow rate through the recirculation loop. The internal dimensions of the venting mechanism are selected to provide a larger cross-sectional area open to fluid transport than the cross-sectional area of the recirculation loop adjacent the venting mechanism. Based on mass flow rate principles, since the inner diameter increases, the velocity for a constant flow rate decreases. With the slower velocity, the gases rise and comes out of solution until the pressure of the released gases prevents additional gases from coming out of solution. Venting the released gases allows additional gases to come out of solution as the equilibrium originally existing between the gases in solution and out of solution is shifted.

For separation of entrained gases in the recirculation fluids disclosed in the present disclosure, for example, it is desirable that the venting mechanism reduces the flow rate of the fluids flowing therethrough to such that a two-phase stratified flow regime is preferably achieved. The residence time of the fluid within the venting mechanism is controlled by appropriate selection of the length of the venting mechanism to allow sufficient time at the velocity within the venting mechanism for adequate separation of entrained gas from the liquid. The appropriate residence time for a particular fluid flow may similarly be determined by one of ordinary skill in the art either experimentally or empirically For best results, the venting mechanism is disposed or oriented substantially horizontally so that the vapors and gases within the reactants and monomer flowing therethrough collect at the top area of the venting mechanism. The attributes of a desirable venting mechanism allows the gases coming out of solution to be trapped by any design capable of allowing the liquid to pass on the bottom but restricting the flow of the gas on the top.

There are several designs that can be used to disengage the gas from the recirculation fluids. For example, in one embodiment, the venting mechanism preferably comprises an eccentric flat-on-bottom reducer. The venting mechanism preferably also has an effective inner diameter (or greater flow area) larger than the inner diameter of the recirculation loop. The velocity of the recirculation fluid can also be reduced by using multiple parallel sections of the recirculation loop.

As the gases and vapors come out of solution within the venting mechanism, they must be removed. To this end, the venting mechanism preferably further comprises an upstanding degas stand pipe coupled to the venting mechanism. The degas stand pipe has a receiving end in fluid communication with the venting mechanism and an opposed venting end positioned elevationally above the inlet end. Although a straight embodiment is contemplated, it is preferred that the degas stand pipe be non-linear between the receiving end and the venting end. A common feature is that the standpipe is vertically oriented and the venting mechanism is horizontally oriented, which allows the gas to escape without the liquid also flowing out of the standpipe.

It is also desirable to include a flow control device within the degas standpipe to control the flow of fluids there through. The flow control device may be, for example, an orifice; throttle valve; control valve; hand valve; reduced pipe section; outlet pressure control; nozzle; and/or bubble through liquid for head.

The flow control device can be used to allow from approximately 5, 10, 15, 20, 25, 30, 35, 40, 45, 50, 55, 60, 65, 70, 75, 80, 85, 90, or even 95 percent to approximately 95, 90, 85, 80, 75, 70, 65, 60, 55, 50, 45, 40, 35, 30, 25, 20, 15, 10, or even 5 percent of the vapor generated to this distance in the recirculation loop to pass while the remaining percentage is retained within the liquid. It should be understood that as set forth above, any lower limit percentage can be paired with any upper limit percentage. In a preferred embodiment, the flow control device allows approximately 85 to 95 percent of the vapor generated to pass. This ensures that liquid will not pass through the gas line and maintains approximately 5% to 15% of the entrained gas for mixing in the recirculation loop. One of ordinary skill in the art will appreciate that the amount of gas removed cannot approach one hundred percent as a maximum, since the liquid would begin to flow into the standpipe along with the gases, thereby reducing the efficiency and yield of the manufacturing process The venting end of the degas stand pipe is typically in fluid communication with a distillation or adsorber system to which the vapors flow or are evacuated. It is also possible to vent the vapors to ambient. The pressure at the venting end of the degas stand pipe can be controlled when the venting end is in communication with the distillation or adsorber system, whereas when venting to ambient, the venting end will be at atmospheric pressure.

One skilled in the art will appreciate that the efficiency of the vapor removal can be improved by increasing the inner diameter of the recirculation loop adjacent and prior to the venting mechanism to maximize the surface area of the recirculation fluid and minimize the vapor velocity at the surface half of the recirculation loop diameter. If additional surface area is required or desired, additional sections of the recirculation loop may be installed at the same elevation, in which the additional sections run parallel to each other and all include a venting mechanism. This series of parallel sections and venting mechanisms provide additional area for the disengagement of gas from the recirculation fluids.

One skilled in the art will further appreciate that multiple venting mechanisms can be used in the recirculation loop between its influent and effluent. For example, a venting mechanism as set forth above can be placed upstream from the recirculation loop to thereby increase the net positive suction head "NPSH." In connection therewith, it should also be understood that by placing a venting mechanism elevationally above the recirculation pump, the "NPSH" will similarly increase. Furthermore, a venting mechanism placed in the recirculation loop upstream from the pressure decreasing device, such as an eductor, will also increase the "NPSH" for the pressure decreasing device. In still another embodiment, a venting mechanism can be used downstream from the pressure decreasing device and reactant feed system in order to remove any entrained gases which may have been drawn into the recirculation loop when the solid reactant was fed into the recirculation loop via the solid feed system previously set forth herein. Lastly, it should be understood that any combination of two or more said venting mechanism locations is also within the scope and spirit of the present invention.

According to the present invention, the components that are added into the recirculation loop flow to the effluent of the recirculation loop. The components and the other recirculation fluids then re-enter the reactor, or other process features to which the recirculation loop is integrally connected. Thus, this process of adding the components into the recirculation loop performs the function of introducing at least one type of component into the reaction fluid a given manufacturing process.

It will be appreciated that it is advantageous to feed a solid component into the recirculation loop via the feeding conduit so that the solid component can be dissolved by the recirculation fluids before flowing to the effluent of the recirculation loop. To this end, the dissolution of solid component can be facilitated by heating the recirculation loop and/or recirculation fluids, changing the feed mole ratio and/or by altering the pressure within the recirculation loop. However, it should also be understood that it is desirable but not required for the solid component to completely dissolve within the recirculation fluid.

Furthermore, it will also be appreciated that the addition of solid components adjacent to or at a pressure decreasing device, such as an eductor, enables addition of solid components directly into any reaction fluid and/or process fluid found within a given manufacturing process. For example, in those embodiments utilizing an eductor as the means for decreasing the pressure of the recirculation fluids, the vacuum on the eductor throat will keep vapors from lofting up into the solids that are being introduced into the process line. Prior to the instant invention, vapors would condense on the solids and the mixture would become very tacky, thus resulting in the clogging of the entire system. However, in accordance with the present invention, the eductor expansion or divergence zone provides very intense mixing and maintains sufficient separation of the solid component, such as terephthalic acid, so that it does not lump in the various reactor zones. To this end, one of ordinary skill in the art will appreciate that for best results, it is preferred to feed the solid component into the pressure decreasing device, such as an eductor, at any point within the divergence or expansion zone of the pressure decreasing device.

It should also be understood that the process of solid addition described above is likely to pull at least a minimum amount of gas into the recirculation line along with the solids. It is therefore preferable to remove said gas by incorporating a vapor disengagement or venting system, as described herein, downstream from the pressure decreasing device. Alternatively, a liquid feed mechanism can be used to feed a liquid into the solid feed hopper, which will displace the gas being pulled into the recirculation loop, thus minimizing or even eliminating the gases being pulled into the recirculation loop.

As suggested herein, it is also within the scope of the present invention to add additional fluid components into the recirculation loop. The fluid components may be added to assist the solid components in dissolving in the recirculation fluids before reaching the effluent of the recirculation loop, or merely as a convenience so that the additional component does not need to be added separately into a reactor or other process feature downstream. Additionally, the fluid components can be added as a means for increasing the velocity of the recirculation fluids and/or decreasing the viscosity of the recirculation fluids. To this end, it should be understood that a fluid component to be added into the recirculation loop can be a reactive or functional component, i.e., a reactant or, alternatively, the fluid component can be an inert component.

In accordance with this aspect, the fluid component is preferably added into the recirculation loop upstream of the pressure decreasing device (before the addition point of the solid reactant), although the fluid component may likewise be added downstream of the pressure decreasing device. To this end, it is also within the scope of the invention for the fluid component to be fed into the recirculation loop at any point in the loop, even including through the recirculation pump seal. In an alternative embodiment, the fluid component can even be added upstream of the recirculation pump. Furthermore, it should be understood that fluid component can be introduced to the recirculation fluids at any temperature. Therefore, as previously set forth herein, a fluid components can be used as a means for heating or cooling the recirculation fluids depending on the temperature of the fluid component when introduced into the recirculation loop.

It will be appreciated that by practicing the process of the present invention, when the solid component is added through the feed system into the recirculation loop and the fluid component is also added into the recirculation loop, these processes result in adding at least two types of components into a reactor or other process feature into which the effluent of the recirculation loop feeds.

Taking a specific example, one type of component fed into the recirculation loop via the feeding system can be a solid polyester precursor reactant. Such polyester precursor reactants include suitable dicarboxylic acids as set forth above. In a preferred embodiment, the solid polyester precursor reactant is terephthalic acid, which is a solid at room temperature.

In accordance with this same example, a fluid components that can typically be fed into the recirculation loop comprises any one or more of the suitable dihydroxy compounds set forth above. In one embodiment, additional first polyester precursor reactant is fed into the recirculation loop. In a preferred embodiment, ethylene glycol is added as a fluid component into the recirculation loop.

Referring now to FIGS. 1 through 4, it should first be acknowledged that with regard to all figures included herewith, like numbers represent like parts. As such, with regard to FIG. 1, there is provided a recirculation loop 91. The recirculation loop 91 includes a means 92 for increasing the pressure and/or velocity of the recirculation fluids located intermediate its influent 93 and effluent 94. The pressure increasing means 92 is located elevationally below the influent to obtain proper net positive suction head. Once the recirculation fluids pass through the influent 93 and the pressure increasing means 92, the pressure of the recirculation fluids is decreased, at least temporarily, downstream from the pressure increasing means 92 by a pressure decreasing means 95 through which at least a portion of the recirculation fluids flow.

Figure 1:
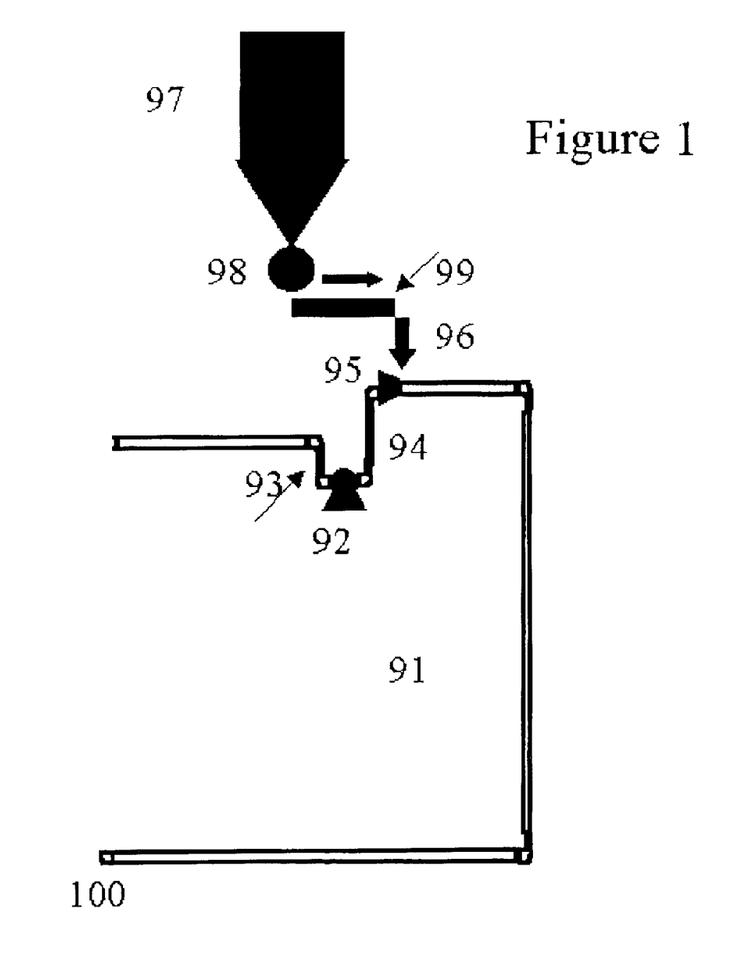
FIG. 1 depicts a first embodiment of the recirculation loop according to the present invention.

To feed or supply components into the recirculation loop, a feeding conduit is used that has a discharge end 96 in communication with the recirculation loop adjacent to the pressure decreasing means 95. The feeding conduit further comprises an integrated feeding system, wherein the first feature of the feeding system is a solid component storage device 97. A solid metering device 98 is located at the bottom of the solid storage device 97. The next feature of the feeding system is a loss in weight feeder 99 that is in communication with the solid metering device 98 and also in communication with the discharge end 96 of the feeding conduit. Thus the components are fed into the recirculation loop 91 from the solid component storage device 97, to the solid metering device 98, into the loss in weight feeder 99, and then through the discharge end 96 of the feeding conduit to be directed into the recirculation loop 91 through the pressure decreasing device.

Figure 2:
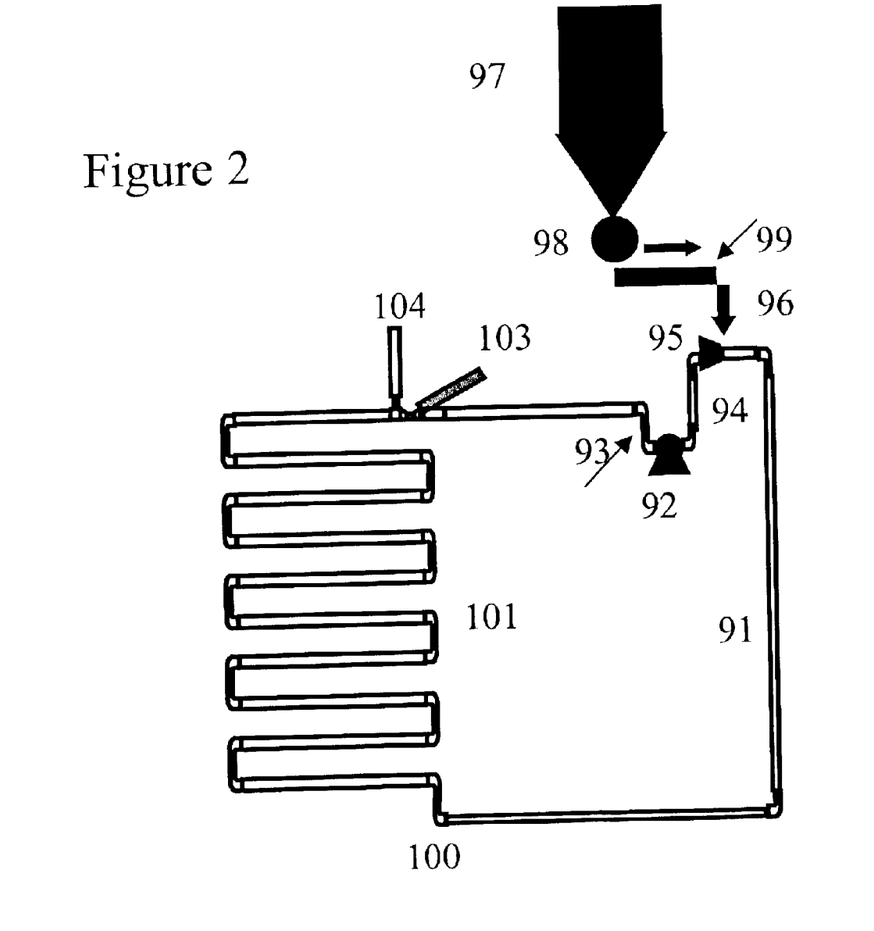
FIGS. 2 and 3 depict two additional embodiments of the recirculation loop according to the present invention wherein the recirculation loop is used in connection with a pipe reactor system.
Figure 3:
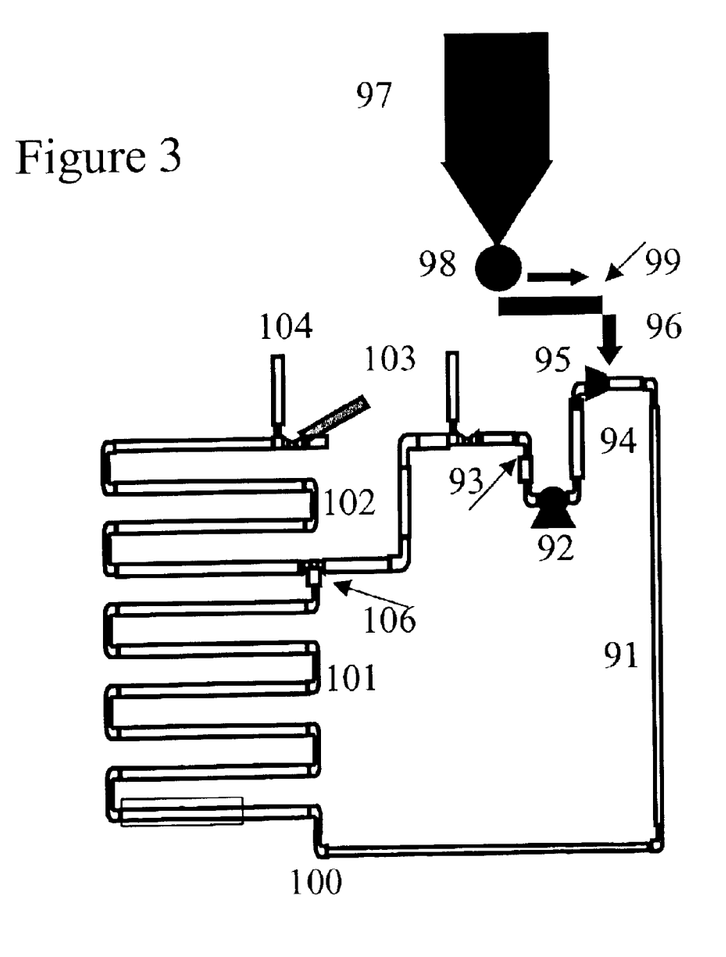

FIGS. 2 and 3 further depict alternative embodiments of the recirculation loop of FIG. 1 wherein the recirculation loop is used integrally with a pipe reactor. When the component added into the recirculation loop and the recirculation fluid flows to the effluent of the recirculation loop, the component and other recirculation fluids re-enter the pipe reactor 101 adjacent or proximal the inlet 100. In FIG. 2, an embodiment is shown where the effluent from the end of the pipe reactor is teed off 106 and one portion of the effluent is sent to the recirculation loop. In a separate embodiment as shown in FIG. 3, a tee 106 is located intermediate the complete pipe reactor 101 and 102, so that the influent for the recirculation loop is not from the end of the reaction process but rather comes from a point intermediate in the reaction process. In FIGS. 2 and 3, the final effluent from the reaction is at line 103 where line 104 represents an optional venting device.

Figure 4:
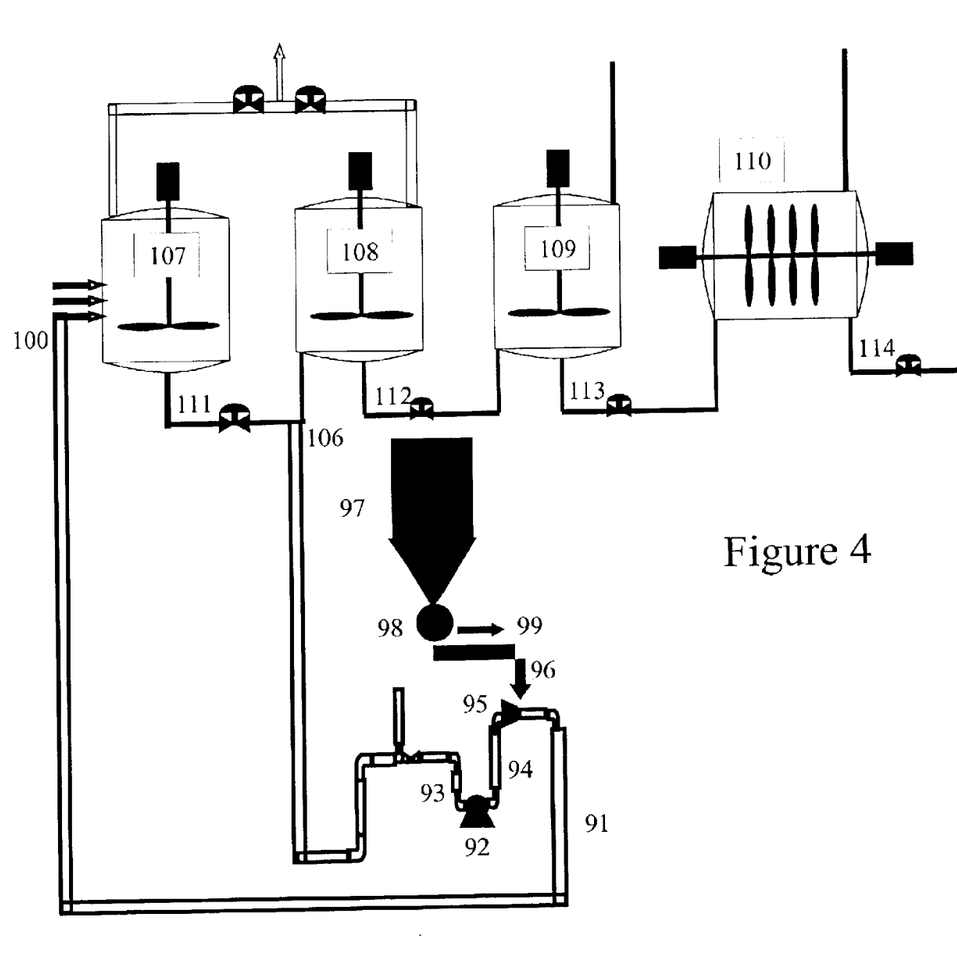
FIG. 4 depicts one embodiment of the present invention wherein the influent of the recirculation loop is in fluid communication with a first CSTR esterification reactor and wherein the effluent of the recirculation loop is also in fluid communication with the first CSTR esterification reactor.

With reference to FIG. 4, there is shown another embodiment of the recirculation loop of FIG. 2 wherein the recirculation loop is used integrally with a continuous stirred tank reactor "CSTR" system comprising a first esterification CSTR 107, a second esterification CSTR 108, a first polycondensation CSTR 109 and a second or final polycondensation CSTR 110. When the components added into the recirculation loop flow to the effluent of the recirculation loop, the added components and other recirculation fluids re-enter the first continuous stirred esterification or ester exchange reactor 107 adjacent or proximal the inlet 100. As shown in FIG. 4, the influent for the recirculation loop is not from the end of the reaction process but rather comes from a tee 106, located along a fluid line 111 in fluid communication with both the first and second esterification reactors, at a point intermediate the first and second esterification reactors such that the influent for the recirculation loop is in fluid communication with the effluent from the first esterification reactor 107.

It should also be understood, that in an alternative embodiment not depicted in FIG. 4, the influent of the recirculation loop can be in fluid communication with a tee located intermediate fluid line 112, such that the influent for the recirculation loop is in fluid communication with the second esterification reactor 108. Likewise, in still another embodiment, the influent for the recirculation loop can from a tee located intermediate fluid line 113 such that the influent for the recirculation loop is in fluid communication with the effluent from the first polycondensation reactor 109. Moreover, in still another embodiment, the influent for the recirculation loop can come from a tee located intermediate fluid line 114, such that the influent for the recirculation loop is the effluent from the final or second polycondensation reactor 110. To this end, it should be understood that although not shown in the figures, the effluent of the recirculation loop can return to the manufacturing process apparatus at any point in the system, i.e., upstream, downstream, adjacent, or even at the influent location.

There are many advantages that can be obtained with the recirculation loop process of the present invention that will be apparent to one skilled in the art based on the discussion above. For example, the use of a recirculation loop allows one of ordinary skill in the art to replace large, bulky and costly equipment such as a paste mix tank, pump, instrumentation, agitator, and other similar devices that are typically used in the art, with a more compact and cost effective recirculation loop comprising a pump and a pressure decreasing device. It will also be appreciated that the recirculation loop is advantageous for injecting solid reactants because they can be substantially dissolved in the recirculation process, preventing or minimizing solid abrasion on the internal process. Thus, it will be understood that the system described herein is less advantageous when only fluid reactants are added (e.g., forming monomer from DMT and EG).

While this invention has been described in connection with preferred embodiments, it is not intended to limit the scope of the invention to the particular embodiments set forth, but on the contrary, it is intended to cover such alternatives, modifications, and equivalents as may be included within the spirit and scope of the invention as defined by the appended claims. For example, there are numerous variations and combinations of reaction conditions, e.g., component concentrations, desired solvents, solvent mixtures, temperatures, pressures and other reaction ranges and conditions that can be used to optimize the product purity and yield obtained from the described process. Also, one skilled in the art will appreciate that in practicing the process of this invention, only reasonable and routine experimentation will be required to optimize such process conditions.

What is claimed is:

1. A process for introducing a solid polyester precursor reactant into a reaction mixture comprising the steps of:
    a) providing a reactor configured to define an internal volume wherein at least a portion of the internal volume is occupied by a reaction mixture comprising a first polyester reactant and a polyester reaction product; and subjecting the reaction mixture to esterification, ester exchange or polycondensation;
    b) providing a recirculation loop having an influent and an effluent wherein the influent is in fluid communication with the internal volume of the reactor;
    c) recirculating at least a portion of the reaction mixture through the recirculation loop wherein the first polyester reactant and polyester reaction product flowing through the recirculation loop are recirculation fluids;
    d) decreasing the pressure of the recirculation fluids with at least one pressure decreasing device at at least one point in the recirculation loop; and
    e) feeding a second polyester reactant into the recirculation loop adjacent to or at the pressure decreasing device, wherein the second polyester reactant is the solid polyester precursor reactant, to thereby introduce solid polyester precursor reactant into the reaction mixture.

2. The process of claim 1, wherein the reactor is a pipe reactor.

3. The process of claim 1, wherein the reactor is a continuous stirred tank reactor.

4. The process of claim 1, wherein the reactor is an esterification reactor, or polycondensation reactor.

5. The process of claim 1, wherein the recirculation loop of step (c) further comprises a recirculation pump located intermediate the recirculation loop influent and effluent for increasing the pressure of the recirculation fluids flowing therethrough.

6. The process of claim 1, wherein the pressure decreasing step of step (d) is downstream from the recirculation pump.

7. The process of claim 1, wherein the pressure decreasing step (d) is performed using an eductor through which at least a portion of the recirculation fluids flow.

8. The process of claim 1, wherein the pressure decreasing step (d) is performed using one or more of a siphon, exhauster, venturi nozzle, jet, or injector.

9. The process of claim 1, wherein the second polyester reactant is fed into the pressure decreasing device.

10. The process of claim 7, wherein the feeding step is performed using a feeding conduit having a receiving end opposed to a discharge end, wherein the discharge end is in fluid communication with the recirculation loop adjacent to or at the eductor and wherein the second polyester reactant is directed into the recirculation loop from the decreased pressure of the recirculation fluids developed by the eductor.

11. The process of claim 10, wherein the feeding conduit further comprises:
    a) a solid storage device in fluid communication with the receiving end of the feeding conduit and located intermediate the receiving end and discharge end of the feeding conduit for storing the second polyester reactant to be fed into the recirculation loop;
    b) a solid metering device in fluid communication with the receiving end of the feeding conduit and located intermediate the receiving end and the discharge end of the feeding conduit; and c) a loss in weight feeder in fluid communication with the receiving end of the feeding conduit and located intermediate the receiving end and the discharge end of the feeding conduit; wherein the second polyester reactant is directed from a point intermediate the receiving end and discharge end of the feeding conduit through the discharge end of the feeding conduit into the recirculation loop.

12. The process of claim 10, wherein the solid storage device is a silo and the solid metering device is a rotary air lock.

13. The process of claim 10, wherein the second polyester reactant is substantially dissolved by the recirculation fluids before flowing to the effluent of the recirculation loop.

14. The process of claim 1, wherein the first polyester reactant comprises a dihydroxy compound and wherein the second polyester reactant comprises a dicarboxylic acid.

15. The process of claim 1, wherein the second polyester reactant is terephthalic acid.

16. The process of claim 1, wherein the second polyester reactant is cyclohexanedimethanol.

17. The process of claim 1, further comprising injecting a third polyester reactant into the recirculation loop upstream from the pressure decreasing device wherein the third polyester reactant is a fluid.

18. The process of claim 1, wherein the polyester reaction product comprises a polyester monomer.

19. The process of claim 1, wherein the polyester reaction product comprises a polyester polymer.

20. The process of claim 1, wherein the reactor is an esterification reactor or ester exchange reactor and the effluent of the recirculation loop is in fluid communication with the reactor.

21. The process of claim 1, wherein the reactor is a polycondensation reactor and the effluent of the recirculation loop is in fluid communication with an esterification or ester exchange reactor.

22. The process of claim 1, wherein the effluent of step (b) is in fluid communication with a first esterification reactor.

23. A process for introducing a solid into a process fluid comprising the steps of:

a) providing a recirculation loop having an influent and an effluent wherein the influent is in fluid communication with a process fluid;

b) recirculating at least a portion of the process fluid of step (a) through the recirculation loop wherein the process fluid flowing through the recirculation loop is a recirculation fluid;

c) decreasing the pressure of the recirculation fluid of step (b) with at least one pressure decreasing device at at least one point in the recirculation loop; and d) feeding a component into the recirculation loop adjacent to or at the pressure decreasing device of step (c), to thereby introduce a component into the process fluid.

24. The process of claim 23, wherein the component is a polyester process component.

25. The process of claim 23, wherein the component is an additive, colorant, modifier, pigment, polyester precursor reactant, polyfunctional branching agent, polyfunctional crosslinking agent, or inhibitor.

26. The process of claim 23, wherein the process fluid comprises a liquid.

27. The process of claim 23, wherein the process fluid is a polyester process reaction mixture.

28. The process of claim 1, wherein the reactor is an esterification reactor.

* * * * *

UNITED STATES PATENT AND TRADEMARK OFFICE
CERTIFICATE OF CORRECTION

PATENT NO. : 6,815,525 B2
DATED : November 9, 2004
INVENTOR(S) : Debruin

It is certified that error appears in the above-identified patent and that said Letters Patent is hereby corrected as shown below:

Column 22,
Line 17, "device at at" should be -- device at --.

Signed and Sealed this

Fifth Day of April, 2005

JON W. DUDAS
*Director of the United States Patent and Trademark Office*